M. F. EWEN & G. H. TOMLINSON.
PROCESS OF PRODUCING FROM LIGNO-CELLULOSE FERMENTABLE SUGAR.
APPLICATION FILED JULY 26, 1909.
938,308. Patented Oct. 26, 1909.
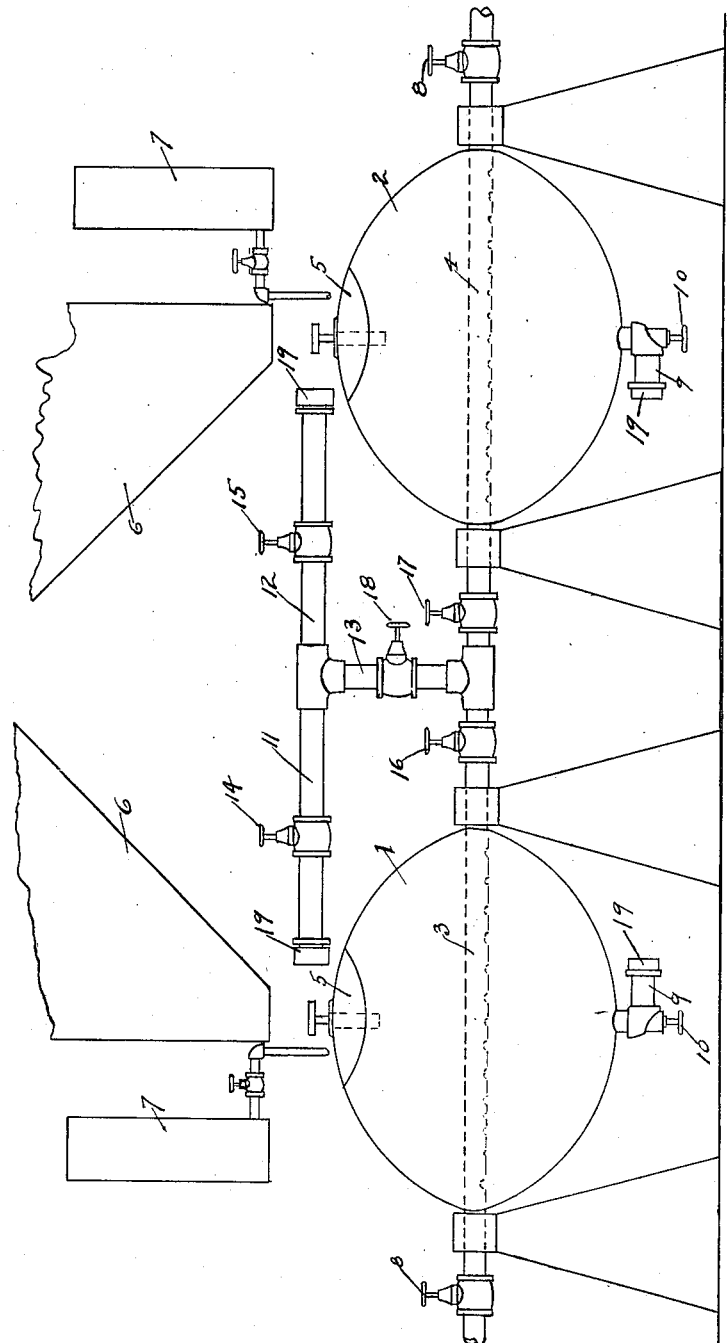

UNITED STATES PATENT OFFICE.

MALCOLM F. EWEN AND GEORGE H. TOMLINSON, OF CHICAGO, ILLINOIS.

PROCESS OF PRODUCING FROM LIGNO-CELLULOSE FERMENTABLE SUGAR.

938,308.  Specification of Letters Patent.  Patented Oct. 26, 1909.

Application filed July 26, 1909. Serial No. 509,680.

*To all whom it may concern:*

Be it known that we, MALCOLM F. EWEN and GEORGE H. TOMLINSON, citizens of the United States, residing at Chicago, in the county of Cook and State of Illinois, have invented a certain new and useful Improvement in the Process of Producing from Ligno-Cellulose Fermentable Sugar, of which the following is a specification.

This invention relates to a process of treating large quantities of ligno-cellulose for the purpose of producing fermentable sugar in large quantities which is adapted to be easily, quickly and efficiently converted into alcohol.

The accompanying drawing shows a diagrammatic view illustrating a form of apparatus for carrying out the process.

In the drawing is illustrated two closed vessels or digesters 1 and 2. The digesters may be of various forms, and the forms illustrated are approximately spherical in shape. These digesters are preferably revolubly mounted upon a suitable support. As herein shown the digesters are revolubly mounted about the pipes 3 and 4, by means of which steam is introduced therein. Each of these pipes is connected to a suitable source of steam supply. These pipes are provided with a series of openings, preferably located on the lower side thereof, so as to distribute the steam over a large area. Each digester is provided with an opening which, as shown, consists of a man-hole 5, by means of which material may be inserted and removed. In order to facilitate the introduction of the acid and the ligno-cellulose there is provided above the digesters the hoppers 6 into which the proper quantity of ligno-cellulose may be inserted, and this ligno-cellulose may be easily and quickly discharged into the digesters when desired. There is also associated with each digester an acid tank 7, which is preferably a measuring tank so that a proper quantity of acid may be introduced. The acid is preferably mixed with water, and the percentage of acid to the water will vary in accordance with the amount of water found in the ligno-cellulose when introduced into the digesters. When the proper amount of material and acid and water are inserted, the man-hole is closed and steam admitted from any suitable source of supply, the admission of the steam being controlled by the valves 8. A single closed vessel may be used or a plurality of these vessels, and when a plurality is used they may be arranged so that the steam from one vessel may be blown into the other, instead of into the atmosphere, so as to utilize the steam in raising the temperature in more than one vessel. As herein shown the closed vessels 1 and 2 are provided with exhausts 9 controlled by valves 10. Pipes 11 and 12 are connected to pipes 3 and 4 by pipe 13, the various pipes being controlled by valves 14, 15, 16 and 17. When it is desired to blow off the steam from vessel 1, for example, into vessel 2, the vessel 1 is rotated about its axis until the exhaust 9 comes into alinement with pipe 11. The two are then connected together by a suitable coupling 19, and valves 10, 14, 18 and 17 opened, and valves 15 and 16 closed. It will thus be seen that the steam will then exhaust into the vessel 2. When it is desired to exhaust the steam of vessel 2 into vessel 1, the vessel 2 is rotated so as to bring the exhaust 9 into alinement with the pipe 12, and they are then connected together and the valves 10, 15, 18 and 16 opened, and the valves 14 and 17 closed. It will be seen that this method results in great economy.

In carrying out the process any suitable form of ligno-cellulose may be used, such, for example, as comminuted wood of any variety, or a mixture thereof, in any suitable form such as sawdust, chips, shavings, etc., or ligno-cellulose in any form, such as straw, corn-stalks, or other plant tissues. The ligno-cellulose is placed in a closed vessel and is mixed before or after being placed therein with a strongly hydrolyzing acid such as sulfuric acid or hydrochloric acid. This acid may be introduced as a solution but in any event the total amount of water in the mixture, including that introduced in such solution, that contained in the ligno-cellulose and that which may be introduced by or with the steam in the process of heating, should not exceed, after blowing off the digester for cooling purposes, twelve times the amount of sugar resulting from the treatment of the ligno-cellulose. One disadvantage of an excessive amount of water is that the amount of sugar in such water is so small that an expensive and difficult process of concentration is necessary before the sugar is in form for fermentation.

When this process is carried out under usual conditions, the percentage of moisture in the material after treatment is only slightly increased above that in the material before treatment, and since under ordinary conditions twenty to thirty per cent. of dry weight of ligno-cellulose (depending, of course, upon the material) is converted into fermentable sugar, the percentage of sugar found after treatment figured on the wet weight of material normally exceeds ten per cent., and is frequently as high as sixteen per cent. or seventeen per cent. The sugar of this material, therefore, may be extracted by the diffusion process in the same manner as that used in extracting sugar from beets, and solutions of similar strength obtained therefrom. It will, therefore, be seen that any step to concentrate the solution obtained from this process, before fermentation, is obviated. The amount of real acid present after such introduction should not exceed six per cent. of such total amount of water under ordinary working conditions. In practice, however, we commonly use from 1 to 5 per centum, but with low temperatures it is possible to use, perhaps, as high as 15 per centum, although always with an increasing amount of decomposition products for excess of acid naturally increases the cost but it also induces the formation of certain decomposition products from the ligno-cellulose which hinder the fermentation.

The commercial use of the process requires the heating of large quantities of material at a time, say, one or more tons, and it has been found that the best results are secured by bringing about the high temperature as quickly as possible.

The process may be carried on irrespective of the source from which the hydrolyzing acid is obtained or the manner of applying it to the ligno-cellulose, provided such acid is in contact with the ligno-cellulose during the time it is at the temperature herein specified. But in any event, the process or treatment should be carried on in such manner and stopped before the advantages of the process are destroyed or rendered unprofitable, as would be the case if there is permitted to be formed in any considerable quantities, products or impurities which are detrimental to fermentation, or which would prevent fermentation of the sugar, and while there is a considerable amount of latitude in carrying out the process, this latter condition must always be borne in mind.

The material is heated in such closed vessel preferably by the introduction of live steam in such quantity as to raise the temperature of the entire mass to what is called the critical point. This is likely to be in practice a temperature of from two hundred and seventy-five to three hundred and twenty-five degress Fahrenheit. By the term "critical point" we mean that temperature at which the decomposition products which hinder fermentation begin to appear in considerable and objectionable quantities, and it obviously varies somewhat according to the amount of acid and water present and other conditions such as the nature of the material. These objectionable products may be formed to a certain degree before the exact critical point is reached, but the critical point broadly considered is that point at which, for practical purposes, the formation in considerable quantities of such undesirable substances may be said to have seriously begun. This rise of temperature should be secured as quickly as possible. It is usually secured in from fifteen to thirty minutes. The quicker the rise in temperature the less the tendency to the formation of these undesired decomposition products, or perhaps more properly termed reversion products, whether they result from the ligno-cellulose or the sugar. In the presence of acids sugar shows a tendency to decomposition at high temperatures, hence the desirability of reaching as quickly as possible the temperature for the maximum hydrolysis which is coincident with, for the purposes of this process, the so-called critical point, and also the necessity of quickly reducing the temperature after the reaction is complete. When this critical point temperature is reached, the material is held at approximately that temperature for from ten minutes to an hour, but preferably under most conditions from thirty to forty-five minutes. This will depend on various conditions and among others on the temperature of the critical point under the conditions of the particular case in question. By the term "reaction" we mean, for practical purposes, the formation of fermentable sugar. The mass of material is then cooled preferably suddenly and this cooling may be brought about by blowing off the gases and vapors from the vessel in which the material is contained. The blowing off is greatly hindered by the presence of a large quantity of water, hence the desirability, as above pointed out, of making the total amount of water small. The temperature when reduced is brought down to what we call the normal which is substantially two hundred and twelve degrees Fahrenheit.

As previously suggested, the process can be carried out by operating the series of digesters in succession, so to speak. The first digester in the series is operated in connection with the carrying out of such a process until it has reached the point where the gases are to be blown off. At this time the next digester in the series should have been charged and brought to the point where it is ready for the reception of the heating gases. The first digester is now blown off, preferably being blown off into the open air until such impurities which it is desired to eliminate have escaped. It is then connected with the second digester so that the latter receives the gases as, for example, the heating steam from the first digester, and in this manner the gases discharged may be passed from digester to digester down the series.

Hitherto extensive efforts and experiments have been made looking to the production of alcohol from saw-dust and the like, by the introduction into the digester of an agent such, for example, as sulfurous acid, or sulfur dioxid, not, in itself, intended to produce the necessary re-action, but calculated to cause the formation within the digester of the required agent, such, for example, as sulfuric acid. These processes, which may be called the sulfurous acid processes, involve, therefore, the introduction into the digester of an otherwise unnecessary agent, and the formation within the digester through the action of the agent introduced, of the active or necessary agent. We discovered as the result of actual and practical operations along these lines, that this intermediate action could be dispensed with and the required agent, such, for example, as sulfuric or hydrochloric acid, could be introduced directly if proper conditions as to quantity of water and temperature should be maintained. Another class of investigators had utilized directly the acids in question, but with high temperatures from, say, 325 Fahrenheit up, and large quantities of water or acid carrying solution, say, two and one-half times as much of such solution as of the material to be treated. This process involves, probably on account of the presence of the large volume of water, high temperature, and this leads to an excessive production of reversion and also other products which hinder the process of fermentation. Moreover, with this large quantity of water, the operation, on a commercial scale, becomes slower, and the high temperature must be maintained for a greater length of time, and thus, again, these harmful products are produced in excessive quantities. The introduction of such a large quantity of water, necessarily results in a dilute solution of sugar, and this requires some concentrating process. Efforts have been made to avoid this by re-using the sugar solution with a new quantity of saw-dust. If the quantity of water is not greatly reduced the process of distilling is seriously interfered with. We discover that these strongly hydrolyzing acids could be successfully used in connection with a small amount of water, that is an amount of water less than two and one-half times the amount of saw-dust, if operated with a relatively low temperature, that is, a temperature, say, less than 325 Fahrenheit as explained heretofore in our discussion of the term "critical point". In this event, the temperature can be raised quickly because of the absence of water and it may be raised in from 15 minutes to an hour, the usual practice being about 15 minutes. Thus by our process, as compared with the prior practice to which we have referred, we obviate, on the one hand, the introduction of the indirect agent and the formation of the direct agent within the digester, and, on the other hand, we obviate the difficulties due to the necessity of concentration incident to the presence of large quantities of water, and the formation of products interfering with fermentation incident to high temperatures.

As an example of one way in which our invention may be realized, we shall briefly state an actual experience. We took about 4,000 lbs. of saw-dust containing 30% of moisture and introduced this into the digester. At the same time and, along with it, and so as to mix the acid with the saw-dust, we introduced about 50 lbs. of 60 degree sulfuric acid previously diluted with about 200 parts of water. The tank was then closed and steam at about 100 lbs. pressure was turned into the tank. The digester was set in motion and the supply of steam continued for about fifteen minutes or until the temperature reached about 310 degrees. The steam was then cut off, but the rotation of the digester continued for about thirty minutes. We then blew off the gases and vapors and took out the material, when it appeared like moist saw-dust and was ready for further treatment to recover the sugar.

We claim:

1. The process of producing fermentable sugars from ligno-cellulose which consists in placing a quantity of it in a closed vessel with not to exceed two and one-half times its weight of water, supplying to the vessel the described quantity of a strongly hydrolyzing acid such as sulfuric acid or hydrochloric acid, quickly raising the temperature of the mixture to about the described critical point, maintaining such temperature until the re-action is completed and then quickly reducing the temperature to at least the boiling point of water.

2. The process of producing fermentable sugars from ligno-cellulose which consists in placing a quantity of it in a closed vessel with not to exceed two and one-half times its weight of water, supplying to the vessel the described quantity of a strongly hydrolyzing acid such as sulfuric acid or hydrochloric acid, quickly raising the temperature of the mixture to about the described critical point, by applying steam thereto, maintaining such temperature until the re-action is completed and then quickly reducing the temperature to at least the boiling point of water.

3. The process of producing fermentable sugars from ligno-cellulose which consists in placing a quantity of it in a closed vessel with not to exceed two and one-half times its weight of water, supplying to the vessel the described quantity of a strongly hydrolyzing acid such as sulfuric acid or hydrochloric acid, quickly raising the temperature of the mixture to about the described critical point, maintaining such temperature for from thirty to forty-five minutes or until the re-action is completed, and then quickly reducing the temperature to at least the boiling point of water.

4. The process of producing fermentable sugars from ligno-cellulose which consists in placing a quantity of it in a closed vessel, with not to exceed two and one-half times its weight of water, supplying to the vessel the described quantity of a strongly hydrolyzing acid such as sulfuric acid or hydrochloric acid, quickly raising the temperature of the mixture to about the described critical point by applying steam thereto, maintaining such temperature for from thirty to forty-five minutes or until the re-action is completed and then quickly reducing the temperature to at least the boiling point of water.

5. The process of producing fermentable sugars from ligno-cellulose which consists in placing a quantity of it in a closed vessel with not to exceed two and one-half times its weight of water, supplying to the vessel the described quantity of a strongly hydrolyzing acid such as sulfuric or hydrochloric acid, quickly raising the temperature of the mixture to about the described critical point, and maintaining such temperature until the re-action is completed, and then quickly reducing the temperature to at least the boiling point of water by blowing off the gases and vapors in the vessel.

6. The process of producing fermentable sugars from ligno-cellulose which consists in placing a quantity of it in a closed vessel, with not to exceed two and one-half times its weight of water, supplying to the vessel the described quantity of a strongly hydrolyzing acid such as sulfuric acid or hydrochloric acid, quickly raising the temperature of the mixture to about the described critical point by applying steam thereto, maintaining such temperature until the re-action is completed and then quickly reducing the temperature to at least the boiling point of water by blowing off the gases and vapors in the vessel.

7. The process of producing fermentable sugars from ligno-cellulose which consists in placing a quantity of it in a closed vessel with not to exceed two and one-half times its weight of water, supplying to the vessel the described quantity of a strongly hydrolyzing acid such as sulfuric acid or hydrochloric acid, quickly raising the temperature of the mixture to about the described critical point, maintaining such temperature for from thirty to forty-five minutes or until the re-action is completed, and then quickly reducing the temperature to at least the boiling point of water by blowing off the gases and vapors in the vessel.

8. The process of producing fermentable sugars from ligno-cellulose which consists in placing a quantity of it in a closed vessel, with not to exceed two and one-half times its weight of water, supplying to the vessel the described quantity of a strongly hydrolyzing acid such as sulfuric acid or hydrochloric acid, quickly raising the temperature of the mixture to about the described critical point by applying steam thereto, maintaining such temperature for from thirty to forty-five minutes, or until the re-action is completed and then quickly reducing the temperature to at least the boiling point of water by blowing off the gases and vapors in the vessel.

MALCOLM F. EWEN.
GEORGE H. TOMLINSON.

Witnesses:
EDNA K. REYNOLDS,
SOPHIE B. WERNER.